United States Patent
Chikaoka et al.

(10) Patent No.: US 8,368,006 B2
(45) Date of Patent: Feb. 5, 2013

(54) DRIVING A LASER SCANNING SECTION USING A BASIC PERIOD OF A PULSE SIGNAL BASED ON A PERIOD OF A RESONANCE FREQUENCY AND ACCUMULATED PERIOD ERRORS TO PRODUCE A CORRECTION PERIOD QUANTITY

(75) Inventors: Atsuhiko Chikaoka, Daito (JP); Atsuya Hirano, Daito (JP); Ken Nishioka, Daito (JP); Hiroshi Nishigaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 360 days.

(21) Appl. No.: 12/782,796

(22) Filed: May 19, 2010

(65) Prior Publication Data

US 2011/0069363 A1 Mar. 24, 2011

(30) Foreign Application Priority Data

May 20, 2009 (JP) ................................. 2009-121534

(51) Int. Cl.
*H01J 3/14* (2006.01)
*G02B 26/10* (2006.01)

(52) U.S. Cl. ..................................... 250/234; 359/197.1

(58) Field of Classification Search .................. 250/234, 250/235, 214 R, 216, 230, 236; 359/196.1, 359/197.1, 199.1, 201.1, 201.2, 204.2, 202.1, 359/204.4, 212.1, 212.2, 213.1, 226.1, 223.1, 359/217.1; 348/744, 756, E9.026, E3.009; 353/98, 99; 358/471, 474, 480, 481; 347/225, 347/250, 233, 235, 247; 372/9, 24, 29.01, 372/29.015, 38.02
See application file for complete search history.

(56) References Cited

U.S. PATENT DOCUMENTS

| | | | |
|---|---|---|---|
| 5,430,472 A * | 7/1995 | Curry | 347/232 |
| 7,252,394 B1 | 8/2007 | Fu | |
| 7,907,019 B1 * | 3/2011 | Brown | 331/18 |
| 8,143,561 B2 * | 3/2012 | Yen | 250/201.1 |
| 2003/0042801 A1 * | 3/2003 | Miyajima et al. | 310/36 |
| 2005/0225833 A1 | 10/2005 | Marshall | |
| 2005/0253055 A1 | 11/2005 | Sprague et al. | |
| 2008/0143979 A1 | 6/2008 | Konno | |
| 2008/0273230 A1 | 11/2008 | Kadowaki | |

FOREIGN PATENT DOCUMENTS

JP 2008-275757 11/2008

OTHER PUBLICATIONS

The Extended European Search Report dated Sep. 21, 2010 (Five (5) pages).

* cited by examiner

*Primary Examiner* — Que T Le
*Assistant Examiner* — Jennifer Bennett
(74) *Attorney, Agent, or Firm* — Crowell & Moring LLP

(57) ABSTRACT

A laser projector can generate a pulse signal capable of being generated according to the resolution of the clock signal, the pulse signal having a basic period and a basic pulse width each infinitely approximated to the characteristics of the resonance frequency. Moreover, because the laser projector can generate a pulse signal capable of correcting the errors led to be included in the approximated pulse signal, the laser projector can drive the scanning section with a horizontal vibration width corresponding to the resonance frequency, and can suitably display a projected image on a projection plane.

8 Claims, 10 Drawing Sheets

FIG.8
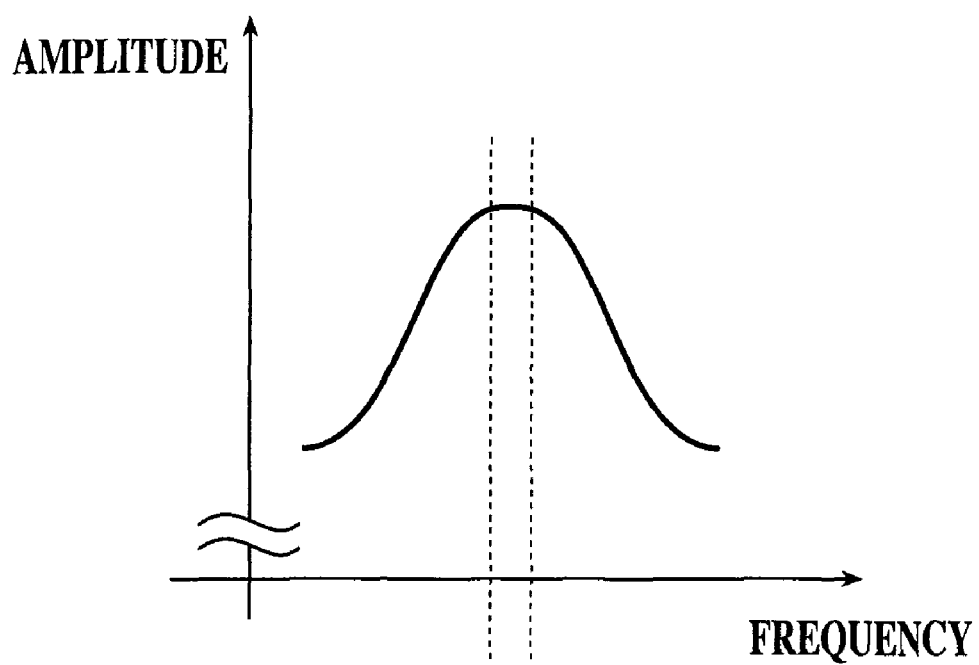
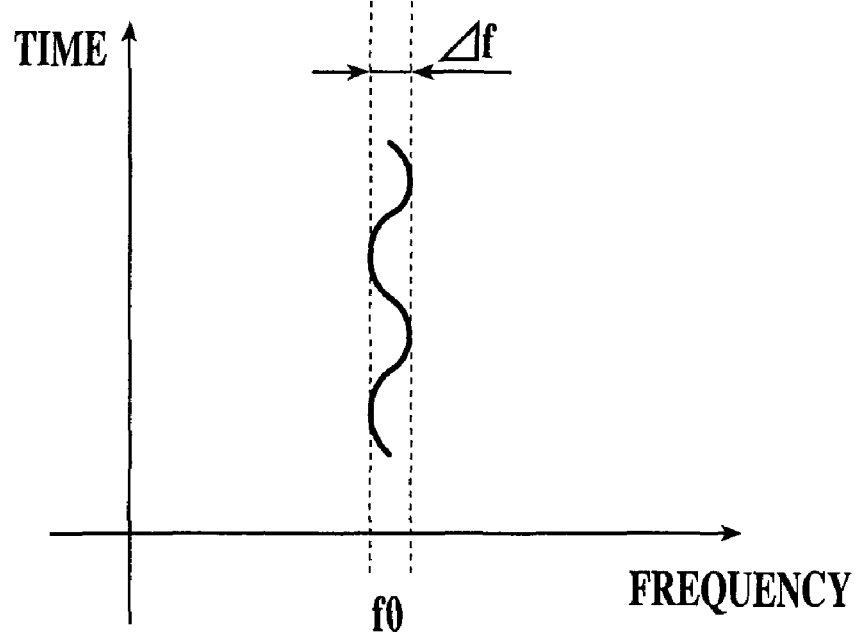

DRIVING A LASER SCANNING SECTION USING A BASIC PERIOD OF A PULSE SIGNAL BASED ON A PERIOD OF A RESONANCE FREQUENCY AND ACCUMULATED PERIOD ERRORS TO PRODUCE A CORRECTION PERIOD QUANTITY

BACKGROUND OF THE INVENTION

1. Field of the Invention

The present invention relates to a laser projector scanning a projection plane with lights from laser light sources to display an image.

2. Related Art

For example, the technique of scanning a screen by irradiating the screen with laser lights from laser light sources in two axis directions by the reflection of the laser lights by a resonant mirror to project an image is known as a laser projector using lasers as the light sources thereof.

Moreover, the technique of adjusting the vibration width of a resonant mirror by changing either the duty ratio or the signal amplitude of a drive signal for vibrating the resonant mirror is known (see, for example, Japanese Patent Application Laid-Open Publication No. 2008-275757.

Because the accuracy of the drive signal for driving the resonant mirror, however, depends on the resolution of a clock signal in the conventional technique described above, a difference sometimes arises between the frequency of the drive signal and the resonance frequency at which the resonant mirror is optimally driven.

Then, if the resonance mirror is driven by the drive signal the frequency of which has a discrepancy from the resonance frequency, the vibration width of the resonant mirror becomes smaller, or the similar phenomena are caused. The conventional technique consequently has the problem of the deterioration of the image quality of an image projected on the screen.

SUMMARY OF THE INVENTION

It is an object of the present invention to provide a laser projector capable of display a projected image suitably.

According to a first aspect of the present invention, there is provided a laser projector, including: a laser light source for radiating a laser light; a scanning section for scanning a projection plane with the laser light from the laser light source in a main scanning direction and a sub scanning direction perpendicular to the main scanning direction of the projection plane to form an image on the projection plane in such a way that a trajectory of the laser light used for scanning in the main scanning direction is arranged in the sub scanning direction; a scanning signal generating section for generating a pulse signal for the scanning section to scan the projection plane with the laser light into the main scanning direction; a drive section for driving the scanning section so that the laser light is scanned reciprocating in the main scanning direction in accordance with the pulse signal generated by the scanning signal generating section; and a period setting section for setting a basic period of the pulse signal capable of being generated according to resolution of a predetermined clock signal based on a period of a resonance frequency and a correction period quantity capable of being generated according to the resolution of the clock signal by accumulating period errors, each equal to a difference between the period of the resonance frequency and the basic period, wherein the scanning signal generating section generates a pulse signal having the basic period set by the period setting section, and a pulse signal of an addition result of the correction period quantity to the basic period every first cumulative number of an accumulation result of the period errors for producing the correction period quantity.

According to a second aspect of the present invention, there is provided a laser projector, including: a laser light source for radiating a laser light; a scanning section for scanning a projection plane with the laser light from the laser light source in a main scanning direction and a sub scanning direction perpendicular to the main scanning direction of the projection plane to form an image on the projection plane in such a way that a trajectory of the laser light used for scanning in the main scanning direction is arranged in the sub scanning direction; a scanning signal generating section for generating a pulse signal for the scanning section to scan the projection plane with the laser light in the main scanning direction; a drive section for driving the scanning section so that the laser light is scanned reciprocating in the main scanning direction in accordance with the pulse signal generated by the scanning signal generating section; a period setting section for setting a basic period of the pulse signal capable of being generated according to resolution of a predetermined clock signal based on a period of a resonance frequency and a correction period quantity capable of being generated according to the resolution of the clock signal by accumulating period errors, each equal to a difference between the period of the resonance frequency and the basic period; a pulse width setting section for setting a basic pulse width of the pulse signal capable of being generated according to the resolution of the predetermined clock signal based on a predetermined pulse width and a correction pulse width quantity capable of being generated according to the resolution of the clock signal by accumulating pulse width errors, each equal to a difference between a good pulse width corresponding to the resonance frequency and the basic pulse width; and a wobbling signal setting section for setting a pulse signal having a frequency wobbled in a predetermined range between both edge of which the resonance frequency is sandwiched, wherein the scanning signal generating section generates a pulse signal having the basic period set by the period setting section, and a pulse signal of an addition result of the correction period quantity to the basic period every first cumulative number of an accumulation result of the period errors for producing the correction period quantity; the scanning signal generating section generates a pulse signal having the basic pulse width set by the pulse width setting section, and a pulse signal of an addition result of the correction pulse width quantity to the basic pulse width every second cumulative number of an accumulation result of the pulse width errors for producing the correction pulse width quantity; and the scanning signal generating section generates a pulse signal set by the wobbling signal setting section.

According to the present invention, even if a scanning section cannot generate a pulse signal having a period corresponding to a resonance frequency enabling the scanning in the optimum main scanning direction due to the resolution of a predetermined clock signal, a laser projector can generate a pulse signal capable of being generated according to the resolution of the clock signal, for example, a pulse signal having a basic period infinitely approximated to the characteristic of the resonance frequency. Moreover, the laser projector can correct the errors led to be included in the generated pulse signal with a correction pulse width quantity, which can be generated according to the resolution of the clock signal and is generated by the accumulation of a first cumulative number of period errors each equal to the difference between the period of the resonance frequency and the basic period. Consequently, it becomes possible to make the scanning section perform scanning suitably to suitably display a projected image on a projection plane.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 8 is an explanatory diagram pertaining to the wobbling of a frequency:

DETAILED DESCRIPTION OF THE PREFERRED EMBODIMENTS

In the following, the embodiments of the present invention will be described with reference to the accompanying drawings. Incidentally, the scope of the invention is not limited to the shown examples.
(First Embodiment)

Figure 1:
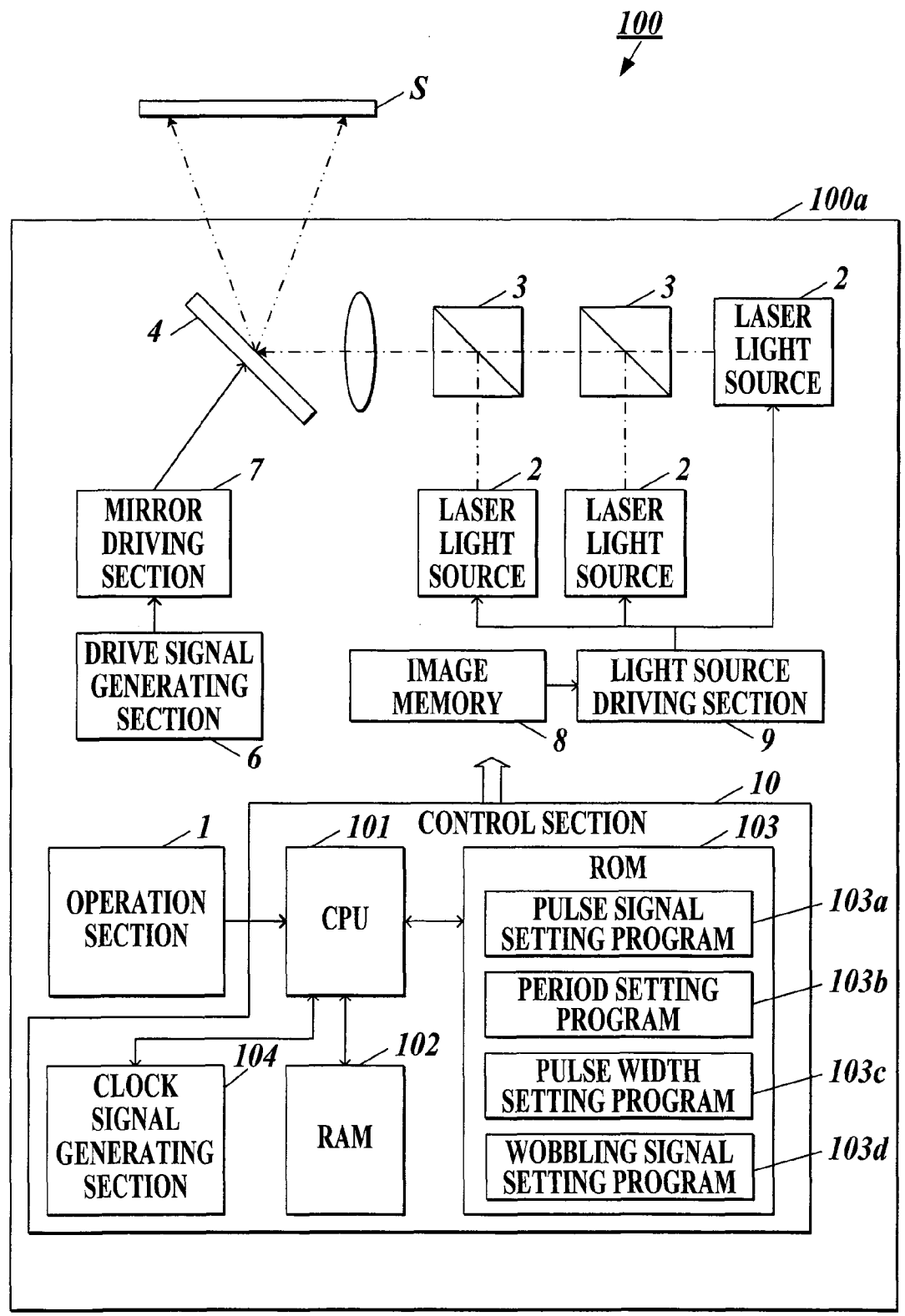
FIG. 1 is a block diagram showing the configuration of the principal part of a laser projector according to the present invention.

A laser projector 100 is, as shown in FIG. 1, composed of: an operation section 1; laser light sources 2, radiating laser lights; mirror sections 3, multiplexing the laser lights from the laser light sources 2; an electromagnetic drive type scanning mirror 4, scanning a screen S, which is a projection plane, with the laser lights from the laser light sources 2; a drive signal generating section 6, generating a drive signal having a predetermined frequency; a mirror driving section 7, driving the electromagnetic drive type scanning mirror 4 on the basis of the drive signals generated by the drive signal generating section 6; an image memory 8, storing image data of an image to be scanned on the screen S; a light source driving section 9, driving the laser light sources 2 on the basis of image data; a control section 10; and the like in a housing 100a.

The laser light sources 2 are, for example, semiconductor lasers (laser diodes (LDs)), to output laser lights of red (R), green (G), and blue (B), respectively, by the drive of the light source driving section 9 based on image data in the image memory 8.

The mirror sections 3 are, for example, dichroic mirrors, transmitting the lights having specific wavelengths and reflecting the lights having the other wavelengths, and the mirror sections 3 multiplex the respective color laser lights from the plurality of laser light sources 2 to make the color laser lights a laser light having one optical axis. Then, the mirror sections 3 emit the laser light to the electromagnetic drive type scanning mirror 4.

The electromagnetic drive type scanning mirror 4 functions as a scanning section to scan the screen S by reflecting the laser lights from the laser light sources 2 into two-dimensional directions by electromagnetic drive to project the laser lights on the screen S. As the electromagnetic drive type scanning mirror 4, for example, an electromagnetic drive type MEMS mirror, using a micro electro mechanical systems (MEMS) technique, is used. The MEMS mirror is a minute apparatus manufactured by integrating mechanical mechanisms and electric circuits on a silicon wafer by using a micro machining technique, and the miniaturization of the whole apparatus can be achieved by using the MEMS mirror.

Figure 2:
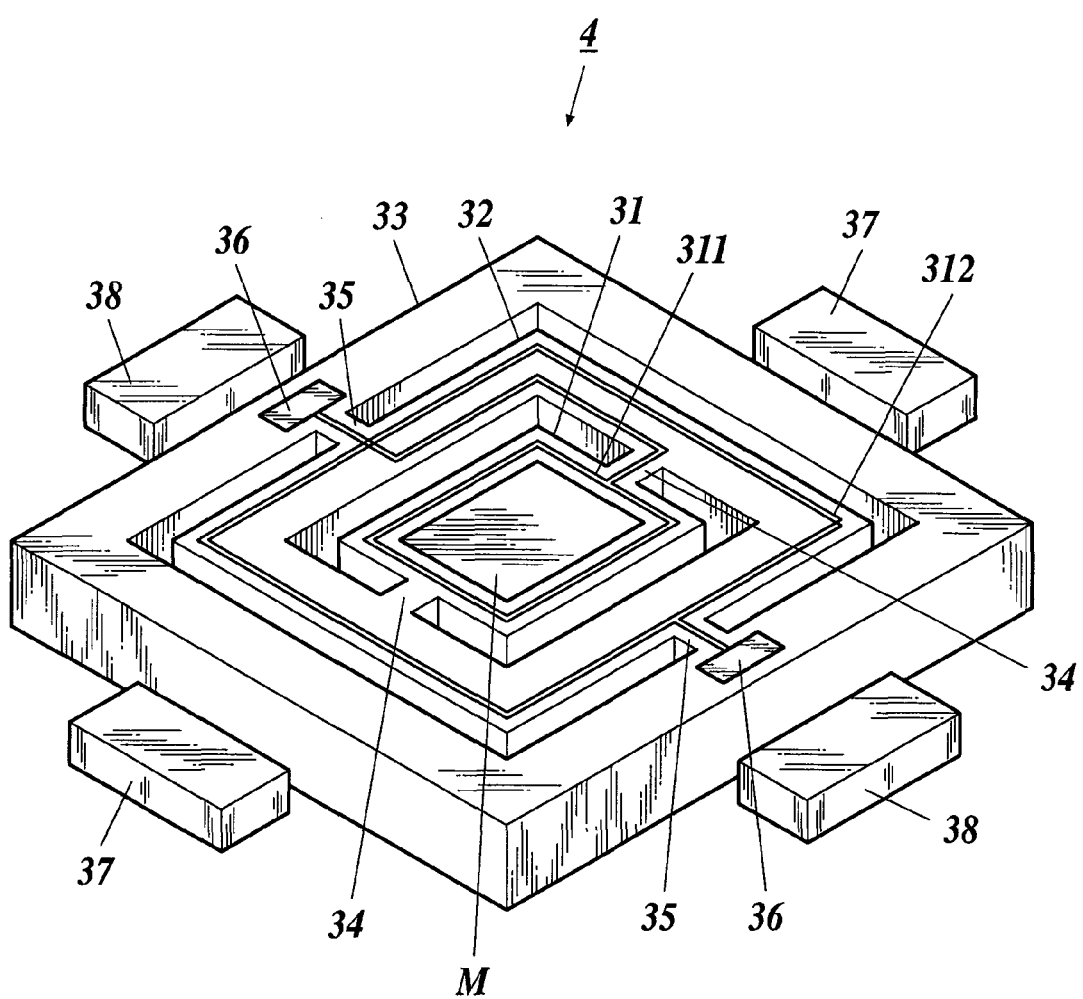
FIG. 2 is a perspective view showing the configuration of an electromagnetic drive type scanning mirror.

The MEMS mirror as the electromagnetic drive type scanning mirror 4 is, as shown in FIG. 2, composed of: a mirror substrate 31, reflecting a laser light; an inside frame 32, formed to enclose the mirror substrate 31; and an outside frame 33, formed to enclose the inside frame 32.

The mirror substrate 31 is supported on the inside of the inside frame 32 with inside shafts 34, and is made to be rockable around the axes of the inside shafts 34. Moreover, the inside frame 32 is supported on the inside of the outside frame 33 with outside shafts 35, being in the directions perpendicular to those of the inside shafts 34, respectively, and the inside frame 32 is made to be rockable around the axes of the outside shafts 35.

The mirror substrate 31 is provided with a mirror M at almost the central part of the surface of the mirror substrate 31, and a planate coil 311 is formed on the periphery enclosing the mirror M. Moreover, a planate coil 312 is formed on the periphery of the surface of the inside frame 32, and both ends of each of the coils 311 and 312 are electrically connected to electrodes 36, respectively.

Moreover, two pairs of permanent magnets 37 and 38 are arranged on the side surface of the outside frame 33 in such a way that their N poles and S poles are opposed to the other ones, respectively. Incidentally, the paired permanent magnets 37 are opposed to each other in the axis line direction of the inside shafts 34, and the paired permanent magnets 38 are opposed to each other in the axis line direction of the outside shafts 35.

The drive signal generating section 6 generates drive signals for driving the electromagnetic drive type scanning mirror 4 into the main scanning direction and the sub scanning direction perpendicular to the main scanning direction in accordance with the control of the control section 10.

The drive signal generating section 6 especially functions as a scanning signal generating section to generate a pulse signal, which is a drive signal for making the electromagnetic drive type scanning mirror 4 perform the main scanning with a laser light moved into the horizontal direction. Moreover, the drive signal generating section 6 generates a drive signal for the electromagnetic drive type scanning mirror 4 to perform the sub scanning with a laser light moved into the vertical direction.

Incidentally, the main scanning into the horizontal direction by the electromagnetic drive type scanning mirror 4 is fast, and the sub scanning into the vertical direction by the electromagnetic drive type scanning mirror 4 is slow. The sub scanning is configured to be performed by moving the laser light into the lower direction by one step at the timing after the performance of the main scanning by the one reciprocating movement of the laser light in the horizontal direction. After the performance of the main scanning of the lowermost row, however, the sub scanning returning the laser light into the upper direction relatively fast is performed in order to perform the main scanning of the upper most row. Thus, an image is formed on the projection plane in such a way that a trajectory of the laser light used for scanning in the main scanning direction is arranged in the sub scanning direction.

Now, the drive signal generating section 6 is concretely described.

Figure 3:
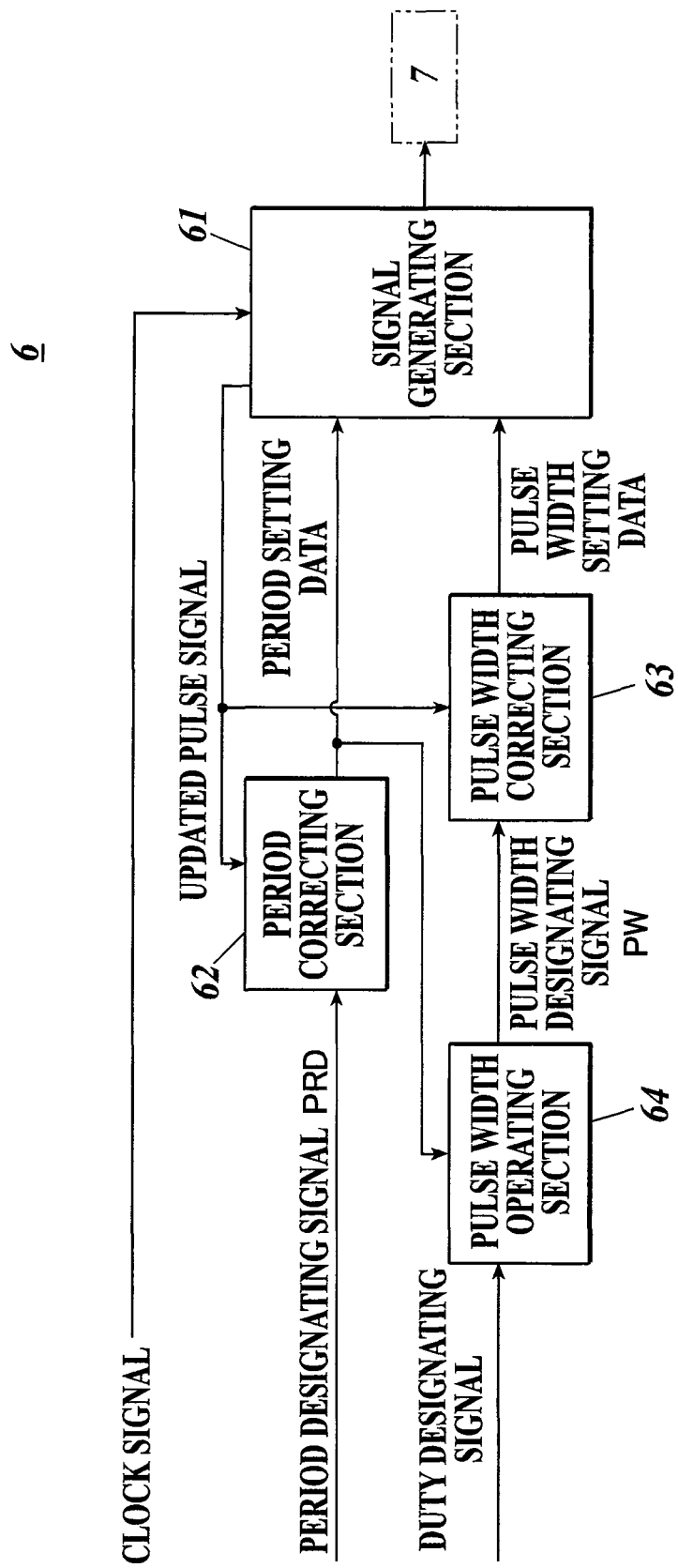
FIG. 3 is a block diagram showing the configuration of the drive signal generating section of the laser projector.

The drive signal generating section 6 is composed of:, for example, as shown in FIG. 3, a signal generating section 61, receiving the input of a reference predetermined clock signal; a period correcting section 62, inputting period setting data to the signal generating section 61; a pulse width correcting section 63, inputting pulse width setting data into the signal generating section 61; a pulse width operating section 64, inputting a pulse width designating signal based on a duty designating signal into the pulse width correcting section 63; and the like.

The signal generating section 61 generates a pulse signal, for enabling the electromagnetic drive type scanning mirror 4 to perform main scanning in the horizontal direction with a laser light, on the basis of a clock signal, period setting data, and pulse width setting data, each input into the signal generating section 61, in accordance with the control of the control section 10, and the signal generating section 61 outputs the generated pulse signal to the mirror driving section 7.

Incidentally, the signal generating section 61 feeds back an updated pulse signal, which has been generated and updated, to the period correcting section 62 and the pulse width correcting section 63.

Figure 4:
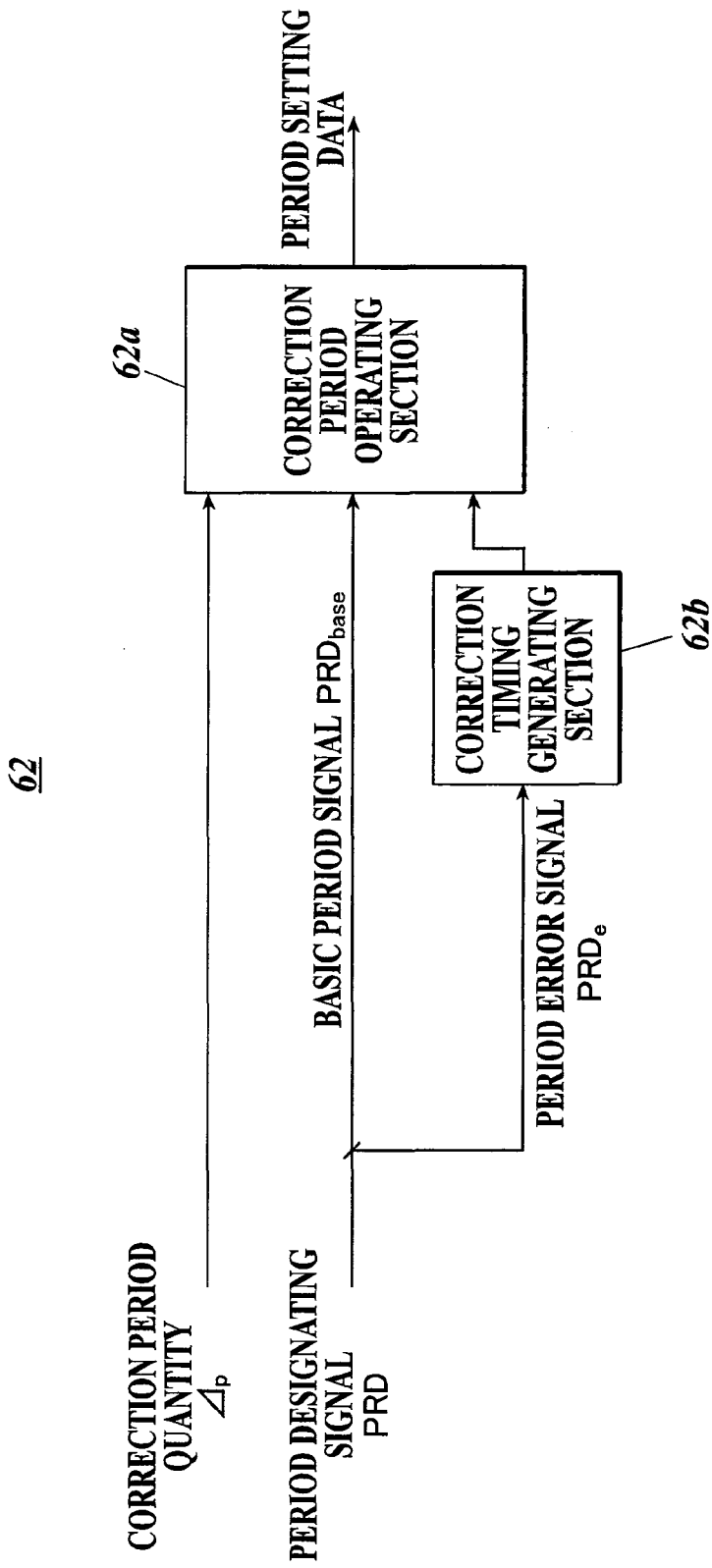
FIG. 4 is a block diagram showing the configuration of the period correcting section of the drive signal generating section.

The period correcting section 62 is composed of, for example, as shown in FIG. 4, a correction period operating section 62a and a correction timing generating section 62b.

The period correcting section 62 outputs the data pertaining to a basic period corresponding to a basic period signal PRDbase based on a period designating signal PRD to the signal generating section 61 as period setting data with the correction period operating section 62a under the control of the control section 10. Incidentally, the basic period is a period infinitely approximated to the period of a resonance frequency peculiar to the electromagnetic drive type scanning mirror 4.

Moreover, the period correcting section 62 counts period error signals PRDe based on the period designating signal PRD with the correction timing generating section 62b, and outputs the data corresponding to the correction timing at which the counted period error signals PRDe become a predetermined number (first cumulative number), which data pertains to a correction period quantity $\Delta p$, which is an accumulation of the predetermined number of period error signals PRDe, to the signal generating section 61 as period setting data with the correction period operating section 62a under the control of the control section 10.

Figure 5:
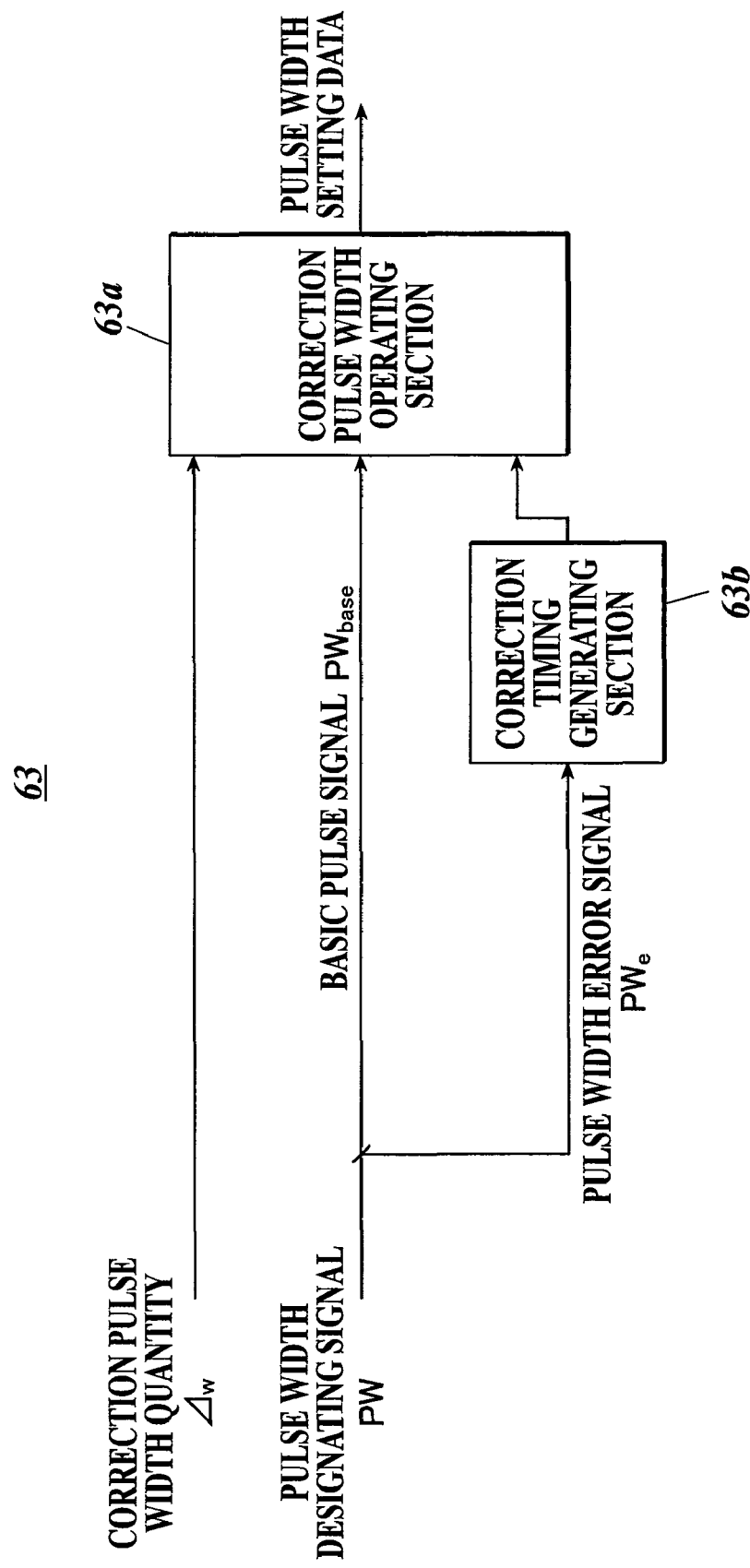
FIG. 5 is a block diagram showing the configuration of the pulse width correcting section of the drive signal generating section.

The pulse width correcting section 63 is composed of, for example, as shown in FIG. 5, a correction pulse width operating section 63a and a correction timing generating section 63b.

The pulse width correcting section 63 outputs the data pertaining to a basic pulse width corresponding to a basic pulse signal PWbase based on a pulse width designating signal PW to the signal generating section 61 as pulse width setting data with the correction pulse width operating section 63a under the control of the control section 10. Incidentally, the basic pulse width a pulse width infinitely approximated to the pulse width of the resonance frequency peculiar to the electromagnetic drive type scanning mirror 4.

Moreover, the pulse width correcting section 63 counts pulse width error signals PWe based on the pulse width designating signal PW with the correction timing generating section 63b, and outputs the data corresponding to the correction timing at which the counted pulse width error signals PWe become a predetermined number (second cumulative number), which data pertains to a correction pulse width quantity $\Delta w$, which is an accumulation of the predetermined number of pulse width error signals PWe, to the signal generating section 61 as pulse width setting data with the correction pulse width operating section 63a under the control of the control section 10.

The mirror driving section 7 is connected to the electrodes 36 of the electromagnetic drive type scanning mirror 4 to drive the electromagnetic drive type scanning mirror 4 on the basis of the drive signal generated in the drive signal generating section 6. In particular, the mirror driving section 7 functions as a drive section to reciprocate the electromagnetic drive type scanning mirror 4 into the main scanning direction (horizontal direction) in accordance with the pulse signals generated in the drive signal generating section 6.

Then, when a drive voltage according to a drive signal is applied to the electrodes 36 at both the ends of the coils 311 and 312 in the electromagnetic drive type scanning mirror 4 to flow a drive current, a Lorentz force is generated by the interaction of the drive current and the magnetic fields generated by the permanent magnets 37 and 38, and the mirror substrate 31 and the inside frame 32 severally incline around the inside shafts 34 and the outside shafts 35, respectively, as shaft centers.

Accordingly, by controlling the drive current made to flow through the electromagnetic drive type scanning mirror 4, it is possible to freely rock the electromagnetic drive type scanning mirror 4 into two directions perpendicular to each other (horizontal direction and vertical direction) around the shaft centers of the inside shafts 34 and the outside shafts 35.

When a pulse signal, which is a drive signal varies at a predetermined period, is made to flow through the electromagnetic drive type scanning mirror 4, the electromagnetic drive type scanning mirror 4 is led to vibrate at the predetermined period according to the period (frequency) of the pulse signal. In particular, if the electromagnetic drive type scanning mirror 4 is driven at the resonance frequency $f_0$ thereof, the electromagnetic drive type scanning mirror 4 rocks by the maximum deflection angle of the current value thereof, and consequently a large image can be displayed by lower electric power at the maximum efficient. That is, when the electromagnetic drive type scanning mirror 4 is driven by a pulse signal of the resonance frequency $f_0$, the optimum scanning in the main scanning direction can be performed.

The operation section 1 is provided on the surface of the housing 100a. The operation section 1 receives the input of various pieces of data, such as the set distance and angle of the laser projector 100 to the screen S, operation input, and the like, and outputs the data and the operation signals to the control section 10.

The image memory 8 stores the image data of an image to be displayed on the screen S. Incidentally, the supply source of the image data is not limited to the image memory 8, but the image data stored in various storage apparatus of a personal computer (PC), a video camera, and the like, connected to the housing 100a may be used.

The light source driving section 9 drives the laser light sources 2 on the basis of the image data read out from the image memory 8, and adjusts the laser lights to each pixel to switch the color of the laser light multiplexed by the mirror sections 3.

The control section 10 is composed of:, for example, a central processing unit (CPU) 101; a random access memory (RAM) 102, used as a work area of the CPU 101; a read only memory (ROM) 103, storing various kinds of data, programs, and the like; a clock signal generating section 104, and the like.

The clock signal generating section 104 generates clock signals, each having a predetermined resolution, and outputs the generated clock signals to the CPU 101 and the drive signal generating section 6.

The CPU 101 executes various programs stored in the ROM 103 in accordance with input signals input from each section of the laser projector 100, and outputs output signals to each section on the basis of the executed programs. The CPU 101 thereby performs the integrated control of the whole operation of the laser projector 100.

The ROM 103 stores a pulse signal setting program 103a, a period setting program 103b, a pulse width setting program 103c, a wobbling signal setting program 103d, and the like, in the program storing area thereof.

Moreover, the ROM 103 stores the data pertaining to the resonance frequency, at which the electromagnetic drive type scanning mirror 4 can perform the optimum scanning in the main scanning direction, for example, the data having a good pulse width corresponding to the resonance frequency. Incidentally, the good pulse width corresponding to the resonance frequency means the pulse width suitable for the electromagnetic drive type scanning mirror 4 to perform a better drive at the time of making the electromagnetic drive type scanning mirror 4 perform the drive at the resonance frequency, and the good pulse width can be said to be the optimum pulse width (duty ratio) or a good pulse width (duty ratio) that can be regarded as the optimum one at the resonance frequency, at which the electromagnetic drive type scanning mirror 4 is driven.

The pulse signal setting program 103a is a program for enabling the CPU 101 to realize, for example, the function of setting the pulse pattern of a pulse signal generated by the drive signal generating section 6.

The CPU 101 executes the pulse signal setting program 103a to change the pulse pattern of a pulse signal generated by the drive signal generating section 6 by modulating the period and the pulse width thereof or the like.

The CPU 101 functions as a pulse signal setting section by executing this pulse signal setting program 103a.

The period setting program 103b is a program for enabling the CPU 101 to realize, for example, the function of setting the basic period of a pulse signal capable of being generated according to the resolution of a predetermined clock signal on the basis the period of the resonance frequency, and the correction period quantity that is an accumulation result of a predetermined number (first cumulative number) of period errors, each equal to the difference between the period of the resonance frequency and the basic period, which correction period quantity can be generated according to the resolution of the clock signal.

The CPU 101 executes the period setting program 103b to set a pulse signal generated by the drive signal generating section 6, the period of which pulse signal is modulated according to the resolution of the predetermined clock signal.

The CPU 101 functions as a period setting section by executing this period setting program 103b. The period setting section can be said to be a part of the pulse signal setting section.

Incidentally, the CPU 101 as the period setting section ideally sets a pulse signal having the period of the resonance frequency, but the CPU 101 cannot help setting a pulse signal capable of being generated at the resolution of the predetermined clock signal because the drive signal generating section 6 is configured to generate the pulse signal on the basis of the predetermined clock signal.

Accordingly, the CPU 101 as the period setting section is configured to obtain a basic period (PRDbase), which is the period of a pulse signal capable of being generated according to the resolution of a predetermined clock signal and is approximated to the period of the resonance frequency, and a correction period quantity ($\Delta p$) capable of being generated according to the resolution of the clock signal by accumulating a predetermined number (first cumulative number) of period errors (PRDe), each equal to an error incapable of being expressed at the resolution of the clock signal, each of which period errors is equal to the difference between the period of a resonance frequency and the basic period, by operations or the like, and the CPU 101 is configured to set the period of the pulse signal on the basis of the basic period (PRDbase) and the correction period quantity ($\Delta p$).

Then, the drive signal generating section 6 generates a pulse signal having the basic period (PRDbase) set by the CPU 101 as the period setting section, and generates a pulse signal that is the addition result of the correction period quantity to the basic period every first cumulative number of the accumulation of the period errors (PRDe) in order to produce the correction period quantity ($\Delta p$).

The pulse width setting program 103c is a program for enabling the CPU 101 to realize, for example, the function of setting the basic pulse width of a pulse signal capable of being generated according to the resolution of a predetermined clock signal on the basis the good pulse width corresponding to the resonance frequency, and the correction pulse width quantity that is an accumulation result of a predetermined number (second cumulative number) of pulse width errors, each equal to the difference between the good pulse width corresponding to the resonance frequency and the basic period, which correction pulse width quantity can be generated according to the resolution of the clock signal.

The CPU 101 executes the pulse width setting program 103c to set a pulse signal generated by the drive signal generating section 6, the pulse width of which pulse signal is modulated according to the resolution of the predetermined clock signal.

The CPU 101 functions as a pulse width setting section by executing this pulse width setting program 103c. The pulse width setting section can be said to be a part of the pulse signal setting section.

Incidentally, the CPU 101 as the pulse width setting section ideally sets a pulse signal having the optimum pulse width corresponding to the resonance frequency, but the CPU 101 cannot help setting a pulse signal capable of being generated at the resolution of the predetermined clock signal because the drive signal generating section 6 is configured to generate the pulse signal on the basis of the predetermined clock signal.

Accordingly, the CPU 101 as the pulse width setting section is configured to obtain a basic pulse width (PWbase), which is a pulse width of a pulse signal capable of being generated according to the resolution of the predetermined clock signal and is approximated to the optimum pulse width corresponding to the resonance frequency, and a correction pulse width quantity ($\Delta w$) capable of being generated according to the resolution of the clock signal by accumulating a predetermined number (second cumulative number) of pulse width errors (PWe), each equal to an error incapable of being expressed at the resolution of the clock signal, each of which pulse width errors is equal to the difference between the good pulse width corresponding to the resonance frequency and the basic pulse width, by operations or the like, and the CPU 101 is configured to set the pulse width of the pulse signal on the basis of the basic pulse width (PWbase) and the correction pulse width quantity ($\Delta w$).

Then, the drive signal generating section 6 generates a pulse signal having the basic pulse width (PWbase) set by the CPU 101 as the pulse width setting section, and generates a pulse signal that is the addition result of the correction pulse width quantity to the basic pulse width every second cumulative number of the accumulation of the pulse width errors (PWe) in order to produce a correction pulse width quantity ($\Delta w$).

The wobbling signal setting program 103*d* is a program for enabling the CPU 101 to realize, for example, the function of setting a pulse signal having the frequency wobbled in a predetermined range between both edges of which a resonance frequency is sandwiched.

The CPU 101 executes the wobbling signal setting program 103*d* to set a pulse signal which is generated by the drive signal generating section 6 and has the frequency wobbled at a predetermined wobbling period.

The CPU 101 functions as a wobbling signal setting section by executing this wobbling signal setting program 103*d*. The wobbling signal setting section can be said to be a part of the pulse signal setting section.

The timing to switch a pulse signal by changing the pulse pattern thereof in order to suitably display an image when the laser projector 100 projects the image on the screen S is, next, described with reference to FIG. 6.

Figure 6:
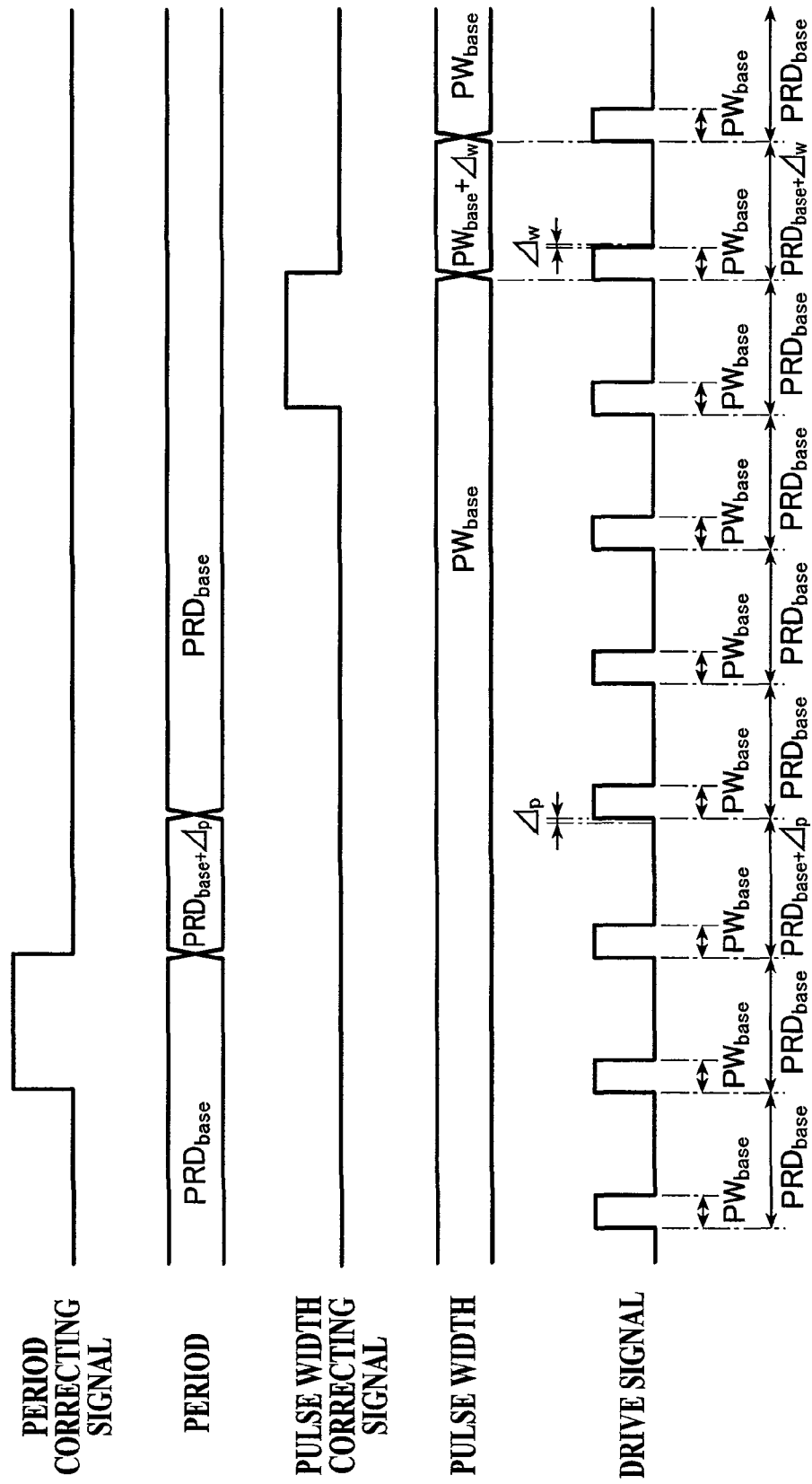
FIG. 6 is an explanatory diagram pertaining to a timing of switching a pulse signal when the laser projector projects an image on a screen.

As shown in FIG. 6, the laser projector 100 generates a pulse signal with the drive signal generating section 6, which pulse signal includes a basic period (PRDbase), which has been set by the CPU 101 as the period setting section and can be generated according to the resolution of a predetermined clock signal, and a basic pulse width (PWbase), which has been set by the CPU 101 as the pulse width setting section and can be generated according to the resolution of the predetermined clock signal. The laser projector 100 drives the electromagnetic drive type scanning mirror 4 on the basis of the generated pulse signal as a drive signal to perform the scanning of the screen S with a laser light. The laser projector 100 thus displays an image on the screen S.

Then, the laser projector 100 generates a pulse signal of an addition result of the correction period quantity ($\Delta p$) to the basic period (PRDbase) every counting a period error signal equal to the first cumulative number of accumulation of the period errors (PRDe) for obtaining the correction period quantity ($\Delta p$) capable of being generated according to the resolution of the predetermined clock signal.

Incidentally, the timing of outputting the pulse signal of the addition result of the correction period quantity ($\Delta p$) to the basic period (PRDbase), which pulse signal is generated every first cumulative number, is based on the period correcting signal (see FIG. 6) output when the correction timing generating section 62*b* (see FIG. 4) counts the first cumulative number of period error signals.

Moreover, the laser projector 100 generates a pulse signal of an addition result of the correction pulse width quantity ($\Delta w$) to the basic pulse width (PWbase) every counting a pulse width error signal equal to the second cumulative number of accumulation of the pulse width errors (PWe) for obtaining the correction pulse width quantity ($\Delta w$) capable of being generated according to the resolution of the predetermined clock signal.

Incidentally, the timing of outputting the pulse signal of the addition result of the correction pulse width quantity ($\Delta w$) to the basic pulse width (PWbase), which pulse signal is generated every second cumulative number, is based on the pulse width correcting signal (see FIG. 6) output when the correction timing generating section 63*b* (see FIG. 5) counts the second cumulative number of pulse width error signals.

As described above, the drive signal generating section 6 in the laser projector 100 according to the present invention can generate a pulse signal which can be generated according to the resolution of a clock signal and is infinitely approximated to the resonance frequency characteristic peculiar to the electromagnetic drive type scanning mirror 4, which pulse signal includes the basic period (PRDbase) and the basic pulse width (PWbase), and further the drive signal generating section 6 can generate a pulse signal of the addition result of the correction period quantity ($\Delta p$) to the basic period (PRDbase) and a pulse signal of the addition result of the correction pulse width quantity ($\Delta w$) to the basis pulse width (PWbase) in order to correct the errors included in the approximated pulse signal.

Then, by driving the electromagnetic drive type scanning mirror 4 on the basis of the pulse signal generated by the drive signal generating section 6, the horizontal vibration width of the electromagnetic drive type scanning mirror 4 can be made to be the one corresponding to the resonance frequency, and consequently a projected image can suitably be displayed on the screen S.

That is, the laser projector 100 cannot generate the pulse signal having the resonance frequency peculiar to the electromagnetic drive type scanning mirror 4 due to the resolution of the clock signal, but can generate the pulse signal that can be generated according to the resolution of the clock signal and has the basic period (PRDbase) and the basic pulse width (PWbase), each infinitely approximated to the characteristics of the resonance frequency. Moreover, because the laser projector 100 can generate a pulse signal for correcting the errors led to be included in the approximated pulse signal, the laser projector 100 can drive the electromagnetic drive type scanning mirror 4 with a horizontal vibration width corresponding to the resonance frequency, and can suitably display a projected image on the screen S.

Accordingly, without giving any configuration and function each enabling the laser projector 100 to obtain a high accuracy clock signal to the laser projector 100, the electromagnetic drive type scanning mirror 4 can be driven with a horizontal vibration width corresponding to the resonance frequency, and can suitably display an image projected onto the screen S.

(Second Embodiment)

A second embodiment of the laser projector 100 according to the present invention is, next, described. Incidentally, the same parts as those of the first embodiment are denoted by the same marks as those of the first embodiment, and only the parts different from those of the first embodiment are described.

The interval at which a scanning position of a laser light is switched in the laser projector 100, is, first, described.

Figure 7:
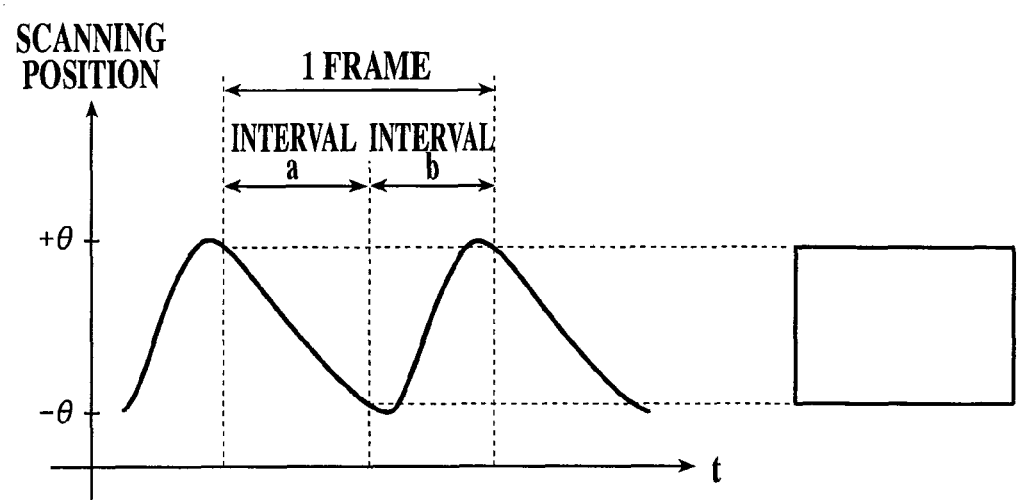
FIG. 7 is an explanatory diagram pertaining to a projection interval and a non-projection interval by the laser projector.

As shown in FIG. 7, the intervals of the scanning using the laser light by the electromagnetic drive type scanning mirror 4 in the laser projector 100 includes a projection interval (interval a) and a non-projection interval (interval b). In the projection interval (interval a), while the electromagnetic drive type scanning mirror 4 moves the laser light into the horizontal direction (main scanning direction) for the scanning, the scanning position is switched from the uppermost row side, which is the start point of a frame, to the lowermost row side, which is the end point of the frame, in the vertical direction (sub scanning direction), to form an image on the screen S. In the non-projection interval (interval b), the scanning position is switched to return from the lowermost row side, which is the end point, to the uppermost row side, which is the start point, in the vertical direction by the electromagnetic drive type scanning mirror 4. Incidentally, the part between the row on the slightly lower side of the uppermost row and the row on the slightly upper side of the lowermost row in the range in which the scanning by the electromagnetic drive type scanning mirror 4 moves from the uppermost row (position at "+θ") to the lowermost row (position at "−θA") is the projection interval (interval a), in which a laser light is actually moved to perform the scanning and an image is formed.

Then, by projecting the image of one frame composed of the projection interval (interval a) and the non-projection interval (interval b) continuously, the image is displayed on the screen S.

The wobbling of the frequency of a pulse signal of the drive signal of the electromagnetic drive type scanning mirror 4 is, next, described.

The CPU 101 as the wobbling signal setting section sets, for example, as shown in FIG. 8, a pulse signal having the frequency wobbled in a predetermined range ($\Delta f$) between both edges of which a resonance frequency $f_0$ is sandwiched at a predetermined wobbling period. Incidentally, the wobbling of a frequency is, for example, to change the frequency of the drive signal (pulse signal) in terms of time within a minute frequency range ($\Delta f$) around the resonance frequency $f_0$ as the center.

Then, by the generation of the pulse signal set to perform the wobbling with the drive signal generating section 6, the frequency of any one of the wobbled pulse signals is approximated to the resonance frequency $f_0$ to generate the pulse signal. Incidentally, as long as a pulse signal is the one having the frequency to be approximated to the resonance frequency $f_0$, the pulse signal can make the horizontal vibration width of the electromagnetic drive type scanning mirror 4 correspond to the resonance frequency $f_0$.

For example, the CPU 101 as the wobbling signal setting section set a pulse signal having a frequency different from each other to each frame composed of the projection interval (interval a) and the non-projection interval (interval b).

Figure 9:
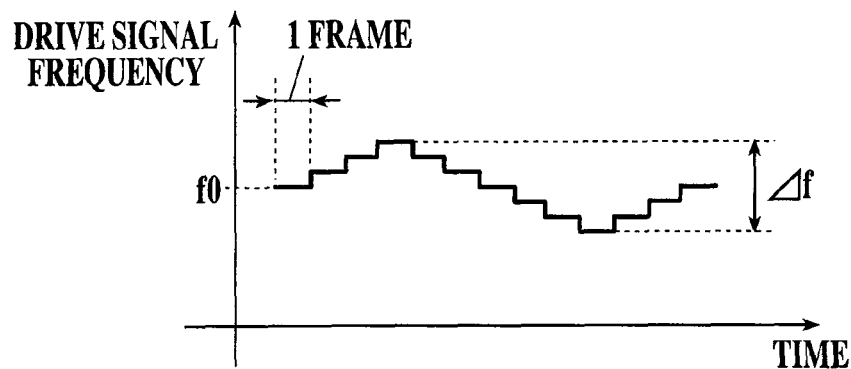
FIG. 9 is an explanatory diagram showing an example of a pulse signal having a wobbled frequency.

To put it concretely, as shown in FIG. 9, the CPU 101, for example, wobbles a frequency in a wobbling period including 12 frames in a period to set a different frequency to each frame. The CPU 101 thereby approximates the frequencies of the pulse signals at the first frame and the seventh frame among the wobbled pulse signals to the resonance frequency $f_0$.

Moreover, the CPU 101 as the wobbling signal setting section sets a pulse signal having the frequency wobbled in the non-projection interval (interval b).

Figure 10:
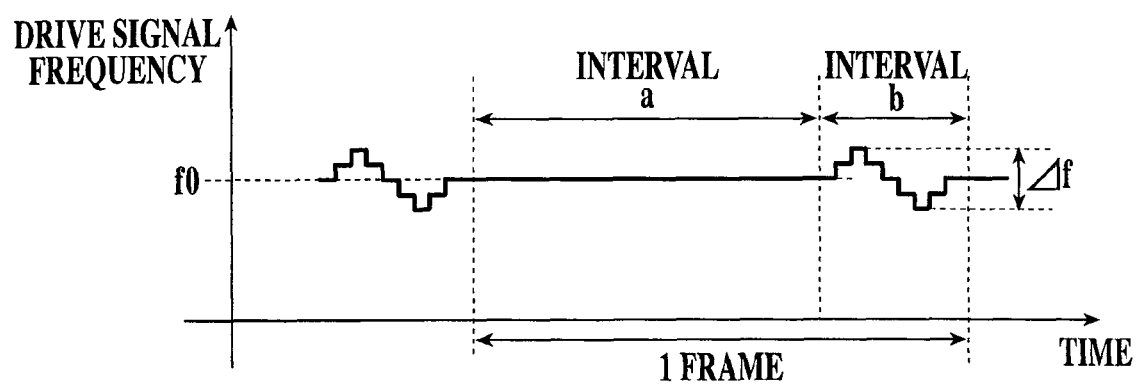
FIG. 10 is an explanatory diagram showing an example of a pulse signal having a wobbled frequency.

To put it concretely, as shown in FIG. 10, the CPU 101, for example, divides the non-projection interval (interval b) into eight parts, and wobbles the frequency of a pulse signal in a wobbling period of the non-projection interval (interval b), divided into eight parts, as a period to set a different frequency to each eight-divided period (first period to eighth period). The CPU 101 thereby approximates the frequencies of the pulse signals at the first period and the fifth period in the non-projection interval (interval b) among the periods of the wobbled pulse signals to the resonance frequency $f_0$.

Moreover, the CPU 101 as the wobbling signal setting section sets a pulse signal having the different frequency to each other to each non-projection interval (interval b).

Figure 11:
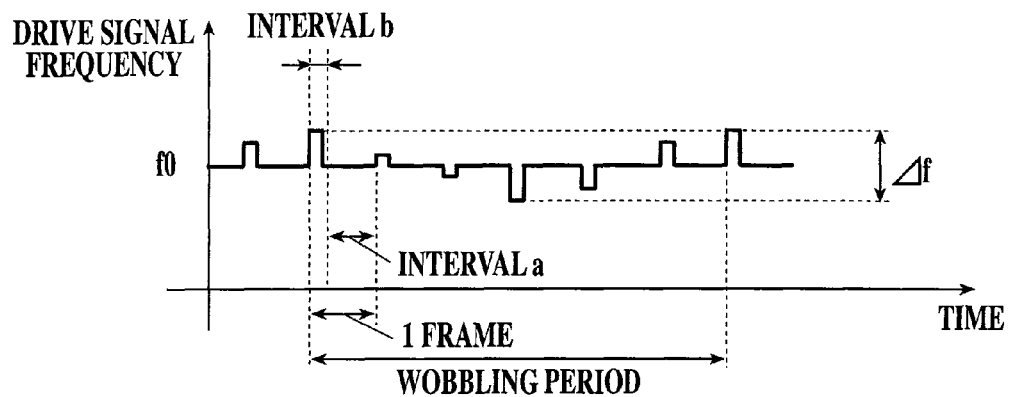
FIG. 11 is an explanatory diagram showing an example of a pulse signal having a wobbled frequency.

To put it concretely, as shown in FIG. 11, the CPU 101, for example, sets a pulse signal having a frequency wobbled in a predetermined range between both edges of which a resonance frequency $f_0$ is sandwiched to switch six kinds of frequencies every non-projection interval (interval b), and the CPU 101 thereby approximates the frequency of a pulse signal in a projection interval (interval a) to the resonance frequency $f_0$.

Moreover, he CPU 101 as the wobbling signal setting section sets a pulse signal having a wobbled frequency so as to make one frame period composed of a projection interval (interval a) and a non-projection interval (interval b) one period.

Figure 12:
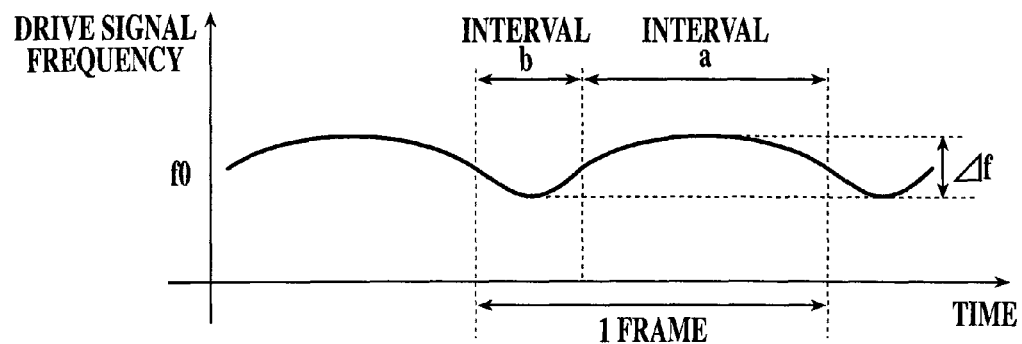
FIG. 12 is an explanatory diagram showing an example of a pulse signal having a wobbled frequency.

To put it concretely, as shown in FIG. 12, the CPU 101, for example, sets a pulse signal having a frequency wobbled in a predetermined range between both edges of which the resonance frequency $f_0$ is sandwiched. The CPU 101 temporarily makes the frequency of the pulse signal the resonance frequency $f_0$ when the frequency is modulated from a lower frequency to a higher frequency or from a higher frequency to a lower frequency by wobbling, and thereby approximates the frequency of the pulse signal to the resonance frequency $f_0$.

As described above, the laser projector 100 according to the present invention can wobble the frequency of a pulse signal in a predetermined range ($\Delta f$) between both edges of which the resonance frequency $f_0$ is sandwiched, and can generate any of the wobbled pulse signals as the pulse signal approximated to the resonance frequency $f_0$.

Then, because the CPU 101 drives the electromagnetic drive type scanning mirror 4 by the pulse signal generated by the drive signal generating section 6 and thereby the CPU 101 can make the horizontal vibration width of the electromagnetic drive type scanning mirror 4 the one corresponding to the resonance frequency $f_0$, a projected image can suitably be displayed on the screen S.

Incidentally, although the resonance frequency $f_0$ of the electromagnetic drive type scanning mirror 4 sometimes varies according to a surrounding temperature change, frequency following can be performed in such a way that the pulse frequency of a drive signal agrees with the resonance frequency $f_0$ while keeping the vibration width of the electromagnetic drive type scanning mirror 4 by performing the wobbling in a minute frequency range, and consequently the projected image can suitably be held even if the variations mentioned above arise.

Incidentally, the application of the present invention is not limited to the embodiments described above, but the present invention can suitably be changed without departing from the sprit and scope thereof.

For example, the processing of the first embodiment and the processing of the second embodiment maybe performed independently besides the performance of the processing in the first embodiment and the performance in the second embodiment by combining them, in which combination the processing of the first embodiment is the processing of generating a pulse signal having the basic period (PRDbase) infinitely approximated to the characteristic of the resonance frequency and the basic pulse width (PWbase) and the processing of the second embodiment is the processing of wobbling the frequency in a predetermined range between both edged of which the resonance frequency $f_0$ is sandwiched to generate any of the wobbled pulse signals as the pulse signal having the frequency approximated to the resonance frequency $f_0$ among the wobbled pulse signals.

The entire disclosure of Japanese Patent Application No. 2009-121534 filed on May 20, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A laser projector, comprising:
a laser light source for radiating a laser light;
a scanning section for scanning a projection plane with the laser light from the laser light source in a main scanning direction and a sub scanning direction perpendicular to the main scanning direction of the projection plane to form an image on the projection plane in such a way that a trajectory of the laser light used for scanning in the main scanning direction is arranged in the sub scanning direction;
a scanning signal generating section for generating a pulse signal for the scanning section to scan the projection plane with the laser light into the main scanning direction;
a drive section for driving the scanning section so that the laser light is scanned reciprocating in the main scanning direction in accordance with the pulse signal generated by the scanning signal generating section; and
a period setting section for setting a basic period of the pulse signal capable of being generated according to resolution of a predetermined clock signal based on a period of a resonance frequency and a correction period quantity capable of being generated according to the resolution of the clock signal by accumulating period errors, each equal to a difference between the period of the resonance frequency and the basic period, wherein
the scanning signal generating section generates a pulse signal having the basic period set by the period setting section, and a pulse signal of an addition result of the correction period quantity to the basic period every first cumulative number of an accumulation result of the period errors for producing the correction period quantity.

2. The laser projector according to claim 1, further comprising a pulse width setting section for setting a basic pulse width of the pulse signal capable of being generated according to the resolution of the predetermined clock signal based on a predetermined pulse width and a correction pulse width quantity capable of being generated according to the resolution of the clock signal by accumulating pulse width errors, each equal to a difference between the good pulse width corresponding to the resonance frequency and the basic pulse width, wherein
the scanning signal generating section generates a pulse signal having the basic pulse width set by the pulse width setting section, and a pulse signal of an addition result of the correction pulse width quantity to the basic pulse width every second cumulative number of an accumulation result of the pulse width errors for producing the correction pulse width quantity.

3. The laser projector according to claim 1, further comprising a wobbling signal setting section for setting a pulse signal having a frequency wobbled in a predetermined range between both ends of which the resonance frequency is sandwiched, wherein
the scanning signal generating section generates a pulse signal set by the wobbling signal setting section.

4. The laser projector according to claim 3, wherein
the scanning section includes a projection interval, in which, while the projection plane is scanned with the laser light in the main scanning direction, a scanning position is switched from a start point to an endpoint in the sub scanning direction to form the image on the projection plane, and a non-projection interval, in which the scanning position by the scanning section is switched in the sub scanning direction to return from the end point to the start point, and
the wobbling signal setting section sets a pulse signal having a frequency different from each other in each frame composed of the projection interval and the non-projection interval.

5. The laser projector according to claim 3, wherein
the scanning section includes a projection interval, in which, while the scanning section scans the projection plane with the laser light in the main scanning direction, a scanning position is switched from a start point to an end point in the sub scanning direction to form the image on the projection plane, and a non-projection interval, in which the scanning position by the scanning section is switched in the sub scanning direction to return from the end point to the start point, and
the wobbling signal setting section sets a pulse signal having a frequency wobbled in the non-projection interval.

6. The laser projector according to claim 3, wherein
the scanning section includes a projection interval, in which, while the scanning section scans the projection plane with the laser light in the main scanning direction, a scanning position is switched from a start point to an end point in the sub scanning direction to form the image on the projection plane, and a non-projection interval, in which the scanning position by the scanning section is switched in the sub scanning direction to return from the end point to the start point, and
the wobbling signal setting section sets a pulse signal having a frequency different from each other to each non-projection interval.

7. The laser projector according to claim 3, wherein
the scanning section includes a projection interval, in which, while the scanning section scans the projection plane with the laser light in the main scanning direction, a scanning position is switched from a start point to an end point in the sub scanning direction to form the image on the projection plane, and a non-projection interval, in which the scanning position by the scanning section is switched in the sub scanning direction to return from the end point to the start point, and
the wobbling signal setting section sets a pulse signal having a frequency wobbled in such a way that one frame period composed of the projection interval and the non-projection interval is made to be one period.

8. A laser projector, comprising:
a laser light source for radiating a laser light;
a scanning section for scanning a projection plane with the laser light from the laser light source in a main scanning direction and a sub scanning direction perpendicular to the main scanning direction of the projection plane to form an image on the projection plane in such a way that a trajectory of the laser light used for scanning in the main scanning direction is arranged in the sub scanning direction;

a scanning signal generating section for generating a pulse signal for the scanning section to scan the projection plane with the laser light in the main scanning direction;

a drive section for driving the scanning section so that the laser light is scanned reciprocating in the main scanning direction in accordance with the pulse signal generated by the scanning signal generating section;

a period setting section for setting a basic period of the pulse signal capable of being generated according to resolution of a predetermined clock signal based on a period of a resonance frequency and a correction period quantity capable of being generated according to the resolution of the clock signal by accumulating period errors, each equal to a difference between the period of the resonance frequency and the basic period;

a pulse width setting section for setting a basic pulse width of the pulse signal capable of being generated according to the resolution of the predetermined clock signal based on a predetermined pulse width and a correction pulse width quantity capable of being generated according to the resolution of the clock signal by accumulating pulse width errors, each equal to a difference between a good pulse width corresponding to the resonance frequency and the basic pulse width; and a wobbling signal setting section for setting a pulse signal having a frequency wobbled in a predetermined range between both edge of which the resonance frequency is sandwiched, wherein the scanning signal generating section generates a pulse signal having the basic period set by the period setting section, and a pulse signal of an addition result of the correction period quantity to the basic period every first cumulative number of an accumulation result of the period errors for producing the correction period quantity;

the scanning signal generating section generates a pulse signal having the basic pulse width set by the pulse width setting section, and a pulse signal of an addition result of the correction pulse width quantity to the basic pulse width every second cumulative number of an accumulation result of the pulse width errors for producing the correction pulse width quantity; and the scanning signal generating section generates a pulse signal set by the wobbling signal setting section.

* * * * *